US006373850B1

(12) United States Patent
Lecourtier et al.

(10) Patent No.: US 6,373,850 B1
(45) Date of Patent: Apr. 16, 2002

(54) STAND ALONE ROUTING SWITCH AND VIDEOCONFERENCING SYSTEM USING THE STAND ALONE ROUTING SWITCH

(75) Inventors: Georges Lecourtier, Versailles; Anne Kaszynski, Ablis, both of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/110,329

(22) Filed: Jul. 6, 1998

(30) Foreign Application Priority Data

Jul. 10, 1997 (FR) ............................................ 97 08814

(51) Int. Cl.$^7$ ............................................... H04L 12/02
(52) U.S. Cl. ....................................................... 370/409
(58) Field of Search ................................ 370/259, 260, 370/261, 263, 267, 464, 465, 485, 486, 487, 488, 489, 490, 412, 413, 414, 415, 416, 423, 409; 379/93.21, 202, 204, 205, 412, 413, 428, 429; 711/112, 113, 118, 216

(56) References Cited

U.S. PATENT DOCUMENTS

| 5,261,066 A | | 11/1993 | Jouppi et al. | |
|---|---|---|---|---|
| 5,872,769 A | * | 2/1999 | Caldera et al. | 370/230 |
| 5,878,043 A | * | 3/1999 | Casey | 370/397 |
| 5,905,729 A | * | 5/1999 | Gaddis et al. | 370/399 |
| 6,118,783 A | * | 9/2000 | Kunito | 370/399 |

OTHER PUBLICATIONS

Thilakam K Et Al.: Proposed High Speed Packet Switch for Broadband Integrated Networks, Computer Communications, vol. 12, No. 6, Dec. 1, 1989, pp. 337–348, XP000083423.

Takeo Koinuma Et Al.: "An ATM Switching System Based on a Distributed Control Architecture" International Switching Symposium, vol. 5, May 28, 1990, Stockholm, Sweden, pp. 21–26, XP000130921.

Licciardi L Et Al.: "A Multichip Module Solution for High Performance ATM Switching", Proc. IEEE Multi–Chip Module Conference, Feb. 6–7 1996, Santa Cruz, CA,USA, pp. 10–15, XP000628430.

Thomann M: "Custom ASIC VLSI Device for Asynchronous Transfer Mode", IEEE International Solid State Circuits Conference, vol. 39, Feb. 1996, pp. 114/115, 427XP000685557.

* cited by examiner

Primary Examiner—Huy D. Vu
Assistant Examiner—Inder Mehra
(74) Attorney, Agent, or Firm—Miles & Stockbridge P.C.; Edward J. Kondracki (57) ABSTRACT

A videoconferencing center (31, 33) for data communications and teleprocessing is provided which comprises first routing switches having a plurality of sending ports (51, 53, 55, 57) and a plurality of receiving ports (50, 52, 54, 56), each sending port adapted to be operatively connected to a receiving data terminal equipment unit (10, 28, 29) or to a receiving port of second routing switch (32, 34), each receiving port adapted to be operatively connected to a sending data terminal equipment unit (10, 28, 29) or to a sending port of another group switching center (32, 34). Each receiving port is assigned a receiving stack (102) that is addressable in a single logical address space and each sending port is assigned a sending stack (103) for containing addresses of said single logical address space. The single logical address reduces the risk of losing data received, which risk results from the necessary limits on physical addresses of stacks. This group switching center is particularly useful for high-speed links of the type that may be required for a videoconferencing system.

22 Claims, 6 Drawing Sheets

STAND ALONE ROUTING SWITCH AND VIDEOCONFERENCING SYSTEM USING THE STAND ALONE ROUTING SWITCH

FIELD OF THE INVENTION

The invention relates to the field of data communications, or teleprocessing and specifically relates to a videoconferencing system using switches of the stand alone routing type.

DESCRIPTION OF RELATED ART

There are known videoconferencing systems which link a limited number of specialized rooms in which conference participants gather. Each room is equipped with a television system constituted by at least one camera, one or more screens and sending and receiving means for allowing the participants in each room to communicate with the participants in other rooms while watching and listening to what takes place in the its other rooms. The communications take place by means of specialized high-speed links for conveying images synchronized with sound. These systems require a costly investment in specialized rooms. Organizing a videoconference requires physically gathering the participants into specialized rooms.

Promising developments in microprocessing, on the other hand, make it possible for two speakers to communicate through the exchange of voice-frequency sounds, synchronized with their corresponding images. Each speaker in this case uses a microcomputer equipped with a camera and means for perceiving and producing sound. By establishing a connection between the two microcomputers, each speaker can display on his screen an animated image of his partner and carry on a discussion with him via the means for perceiving and producing sound. Each microcomputer constitutes data processing terminal equipment, hereinafter simply called DTE (for data terminal equipment). The connection can be established through a modem with which each DTE is equipped. If the two speakers are not too far apart, it is possible to consider establishing the connection through a local area network, for example using the method known as Carrier Sense Multiple Access with Collision Detection, or CSMA/CD.

Without enlarging on the CSMA/CD method defined by the well-known IEEE standard 802.3, let it be noted that a method of this type makes it possible to establish connections between more than two DTEs. A DTE must detect the absence of a signal, or silence, on the hardware line that links it to the other DTEs in order to send a data frame to the other DTEs. The physical properties of the hardware line between DTEs result in a time lag between the sending of a frame by a DTE and the reception of this frame by another DTE. This time lag increases with the distance that separates the DTEs. In order to eradicate the collisions resulting from this delay, a link protocol makes it possible to interrupt the sending of a frame after the detection of a collision, then to resend this frame after a random delay. Moreover, the length of a frame is proportional to the quantity of data transmitted, with a minimal length for detecting a collision. The result of the characteristics of the CSMA/CD method is that average transmission delays remain short on physical lines that are short in length and have a low utilization rate. For example, a transmission that is isolated in time is executed without any preliminary wait. If a plurality of DTEs are constantly sending frames, the effective order of transmission of the frames through the hardware line does not necessarily comply with the order desired by the DTEs. This can cause problems in conveying a large quantity of data through the physical line to a plurality of DTEs, which requires perfect synchronization of their reception, a problem exacerbated by a large distance between DTEs.

The need to convey a large quantity of data that must be received in perfect synchronization exists in various technical fields in which there is high interactivity between a sizeable number of DTEs.

In the field of videoconferencing, in order for several participants to be able to attend the same conference without having to change locations, each participant must be able to send at least one animated image synchronized with sound to the other participants and receive at least one animated image synchronized with sound from the other participants, either in real time or delayed in order to produce, for example, a synthesis of the conference. The image received is for example the image of another participant, a composite image combining the images of other participants, an image from an image bank or any combination of the animated images synchronized with sound cited above. These images are sent and received by means of various DTEs which include, for example, a video server and one or more routers which communicate images with one or more participants connected to the same local area network. Thus, the sending and receiving of animated images synchronized with sound involves a high level of interactivity between a sizeable number of DTEs.

In the field of high-speed industrial processes, a plurality of remote machines may each need to execute, in real time, part of a process having a high level of hardware interaction with other parts of the same process, for example, a process involving the control of material or energy flows. The occurrence of a failure in the industrial process is capable of causing a series of failures, for which it is important to detect an absolute order of occurrence of the failures. The servo-mechanisms between the parts of a process may require exchanges of large quantities of perfectly synchronized parameters. Thus, each machine constitutes a DTE which communicates digital data with other DTEs.

The CSMA/CD method makes it possible to connect a plurality of DTEs, but it is not satisfactory when the DTEs are remote from one another, since retransmissions over long distances after the detection of collisions result in asynchronous receptions of the frames transmitted.

To avoid the problems cited above, it is preferable to establish point-to-point type links between DTEs by means of one or more group switching centers, or stand alone routing switches in such a way that one and only one two-way physical connection exists between a given DTE and a group switching center. This avoids the problem of collisions between the DTE in question and this switch. This switch is provided in order to establish links with the DTEs that are connected to it and possibly with one or more other similar switches to which other DTEs are connected. By establishing links between switches, it is possible to establish links between DTEs connected to different switches.

The group switching center or stand alone routing switch must be designed to establish links from a sending DTE to one or more receiving DTEs and from a plurality of sending DTEs to a receiving DTE or a plurality of receiving DTEs. For example, in a videoconference, links from a sending DTE to one or more receiving DTEs are necessary in order to send a global image of the videoconference from an image server, in this case the sending DTE, to each receiving DTE used by a participant in the videoconference. Links from a plurality of sending DTEs to a receiving DTE are necessary in order to send an image of each participant using a sending DTE to the image server, in this case the receiving DTE, in order to compose the global image of the video conference. Links from a plurality of sending DTEs to a receiving DTE can be used to send an image of each participant using a sending DTE to the image server and an image bank, in this case the receiving DTEs.

Likewise, the group switching center or stand alone routing switch must be designed to establish additional links at any time with new DTEs that are connected. This is the case, for example, when a new participant arrives while the conference is in progress.

SUMMARY OF THE INVENTION

In order to meet the needs indicated above and to respond to the problems cited, the invention proposes a group switching center comprising a plurality of sending ports and a plurality of receiving ports, each sending port is adapted to be connected to a receiving data terminal equipment unit or to a receiving port of another group switching center, or stand alone routing switch each receiving port is adapted to be connected to a sending data terminal equipment unit or to a sending port of another group switching center or stand alone routing switch. The group switching center or stand alone routing switch is characterized in that each receiving port is assigned a receiving stack that is addressable in a single logical address space, and in that each sending port is assigned a sending stack for containing the addresses of this single logical address space.

An advantageous variant of the invention is obtained by assigning each sending port a sending stack for containing data blocks addressed in this logical address space.

The single logical address common to all of the sending stacks and receiving stacks has several advantages. On the one hand, it makes it possible to control, in an orderly way, the processing of data blocks in a sending stack in accordance with the order of arrival of these blocks in one or more receiving stacks, which is useful for synchronizing transfers of data blocks in a link established in the switch, the synchronization with the outside of the switch being verified by the point-to-point connections. On the other hand, the size of each stack is not limited by physical memory size constraints. In effect, the single logical address space allows each stack to have the use of a virtual memory larger than a physical memory, which is immediately available to each stack. This makes it possible to freely oversize each subspace of the single address space specifically reserved for a stack. A mechanism for creating a correspondence between a logical address and a physical address makes it possible for each stack, at a given moment, to use only the physical memory it actually needs.

It is possible to increase the above-mentioned advantages by defining the logical address space in such a way that it is common to the switch and to at least one command processor or another similar switching center.

The physical memory covered by the logical address space can be located in the switch or distributed in a plurality of switches that are also connected through a link of the bus type. When the address space is common to a data terminal equipment unit, such as for example a server of animated images synchronized with sound, all or part of the physical memory can be located in the data terminal equipment unit. However, the physical memory access time must not penalize high-speed data block transfers. High speeds require both a large quantity of physical memory for the stacks and fast access to this physical memory, which constitute two constraints that are a priori contradictory.

According to an additional characteristic of the invention, the sending ports and the receiving ports of the group switching center are grouped into one or more high-density integrated circuits, each of which comprises a very fast access memory physically read-accessed by the sending ports or write-accessed by the receiving ports grouped in the same integrated circuit. The integrated circuit or circuits are connected to a fast access memory in the switch by means of a local bus so as to be able to exchange data blocks between very fast access memories and a fast access memory by means of a first-level cache protocol.

BRIEF DESCRIPTION OF THE DRAWINGS

The advantages and further details of the invention will be readily apparent from the following description of a particular exemplary embodiment, when read in connection with the following drawings wherein.

DESCRIPTION OF THE PREFERRED EMBODIMENT(S)

Figure 1:
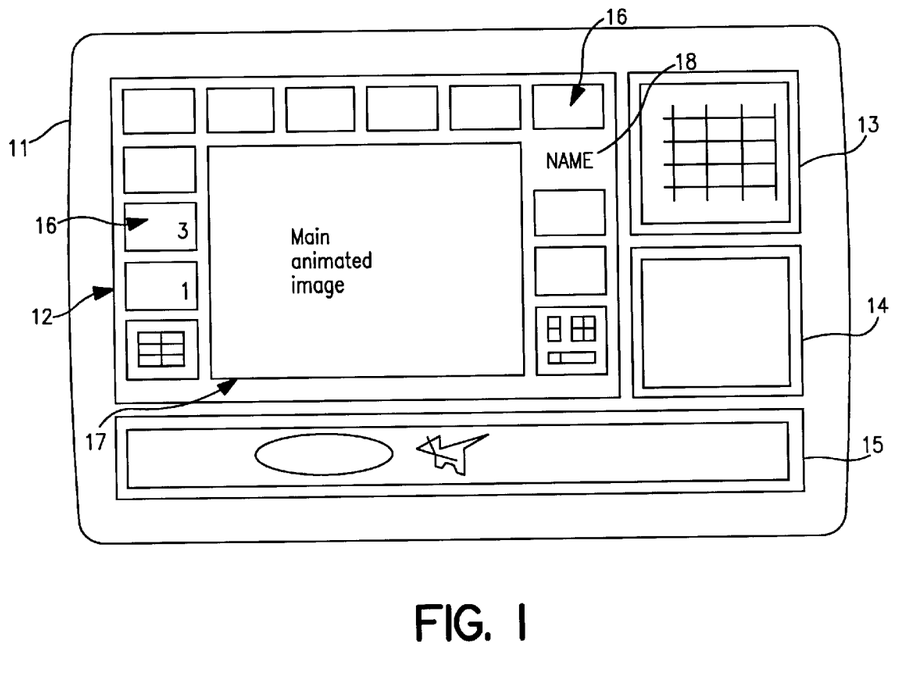
FIG. 1 shows an example of a view displayed on a screen during a videoconference.

A participant in a videoconference uses a screen 11 on which is displayed a view like the one shown in FIG. 1. This view comprises a video dialogue window 12 and one or more information dialogue windows 13, 14, 15.

The window 12 comprises a global animated image of the television type with, to use a non-limiting example, a definition of 576 by 720 pixels, the color of each pixel being taken from a palette of sixteen million available colors. This animated image is composed of one or more animated images 16 of small size and one animated image 17 of large size. Each animated image 16 is intended to show a different participant in the videoconference. When speech is attributed to a particular participant, the latter appears in the animated image 17. If a space 18 in the global animated image has been reserved for the animated image 16 intended to show this particular participant, the space 18 is freed. It is also possible to use the space 18 to display a designation of the particular participant, such as a name, a title or an effigy of the entity to which he belongs. It is possible for each participant in the videoconference to appear in one of the animated images 16 or 17.

The windows 13, 14 and 15 are intended to display computer data such as, for example, the contents of a spreadsheet, text or other type file in the window 13, a file manager in the window 14 and a blank panel on which the participants may write in the window 15.

Figure 2:
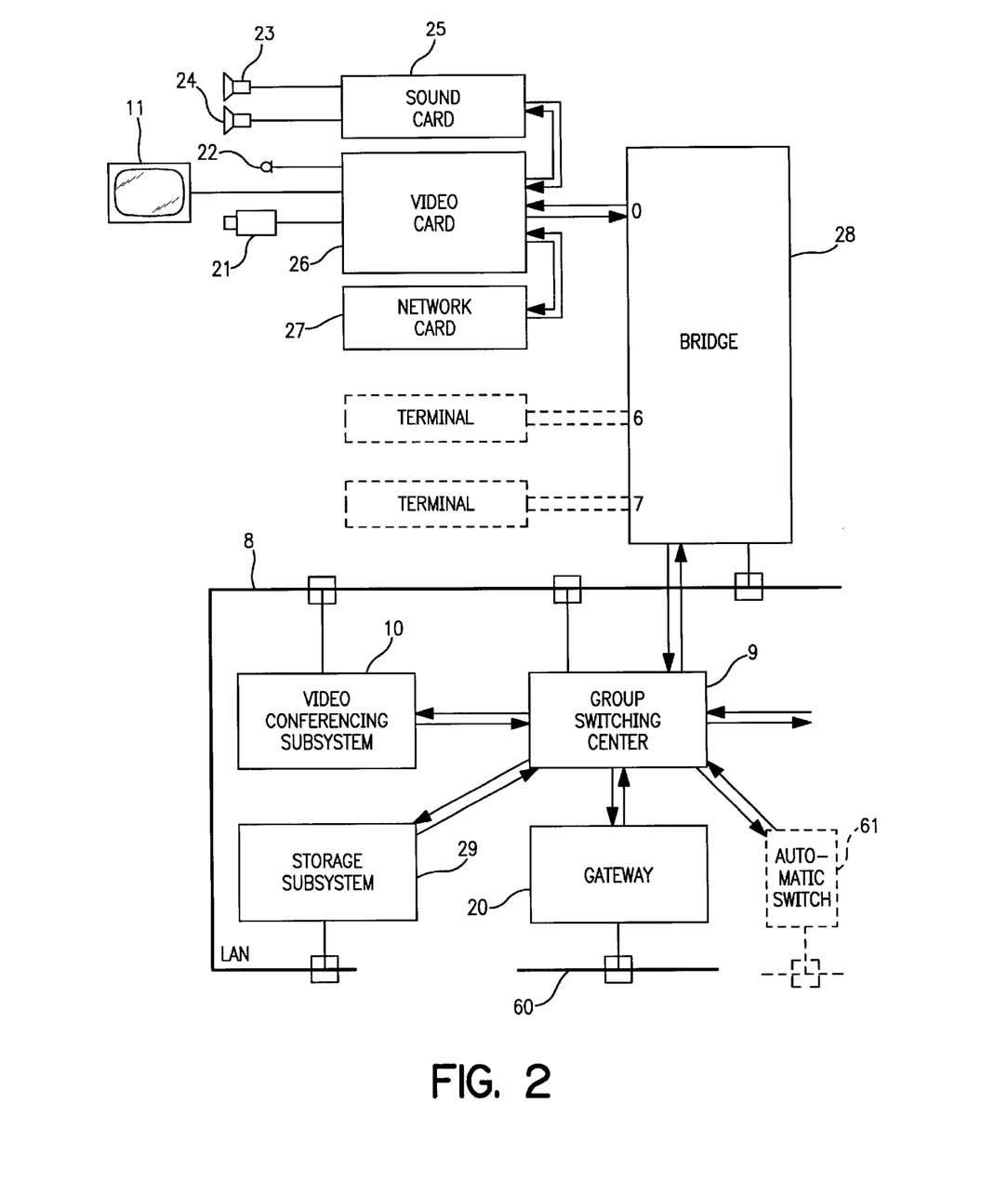
FIG. 2 shows an example of a videoconferencing system suitable for implementing the invention.

In reference to FIG. 2, a person wishing to take part in a videoconference takes his place in front of a terminal, for which only the elements essential to videoconferencing functions are represented here. This terminal is for example a microcomputer or a work station equipped with a camera 21, a microphone 22, the screen 11 described above, and at least one loudspeaker 23 fed by a sound card 25. A second loudspeaker 24 fed by the same sound card 25 makes it possible to obtain stereophonic sound. An adapter video card 26 is connected to the camera 21, the microphone 22 and the sound card 25 on the one hand, and to a network card 27 and a circuit 28 on the other hand. The circuit 28 has a plurality of input-output latches 0, . . . , 6, 7, to each of which the adapter card 26 can be connected through one of various terminals, up to eight in the example of FIG. 2.

The circuit 28 is connected to a first local area network 8 and to a switching center 9. The switching center 9 is connected, on the one hand, to the first local area network 8, to a videoconferencing subsystem 10 and to a storage subsystem 29 which is itself connected to the local area network 8, and on the other hand to a gateway 20 and possibly to an automatic telephone switch 61. The gateway 20 and/or the automatic telephone switch 61 provide access to a wide area network 60.

The local area network 8 of the multipoint type linking the switch 9 to one or more circuits 28, to the videoconferencing subsystem 10, and to the storage subsystem 29, is more particularly dedicated to the transmission of computer data.

The adapter video card 26 performs videoconferencing and telecommunication functions. The purpose of the adapter card 26 is to interface the terminal with a network, for example of the known ATM type, to perform a real-time compression-decompression of video signals with a first low TCD ratio such as that produced, for example, by a discrete cosine transform, and to multiplex-demultiplex computer data, sound and animated images.

The circuit 28 provides a copper/fiber optic interface with the switching center 9.

The switching center 9 performs the routing of sound and video communications. A fiber optic connection from the switching center 9 to one or more circuits 28, to the videoconferencing subsystem 10, to the storage subsystem 29, and possibly to the gateway 20, or inclusively to the automatic telephone switch 61, produces a star network which constitutes a second local area network, more specifically dedicated to the transmission of sound and images.

The subsystem 10 performs video processing and audio processing functions such as those of the ITU/H.231 standard. The subsystem is essentially constituted by a video server, not shown, which constitutes a data terminal equipment unit for composing one or more animated images synchronized with sound such as that described in reference to FIG. 1.

The function of the storage subsystem 29 is to store the video data (sound and animated images) and the computer data exchanged during a videoconference. This makes it possible to review all or part of the conference at a later time and to archive the essential elements. By consulting the storage subsystem 29, a participant joining a conference in progress can find out the points discussed in his absence in order to update himself quickly and participate more fully in the subsequent discussion.

The switch 9 is embodied by means of one or more group switching centers or stand-alone routing switches according to the invention, in such a way that it can convey large quantities of data representing animated images synchronized with sound.

Figure 3:
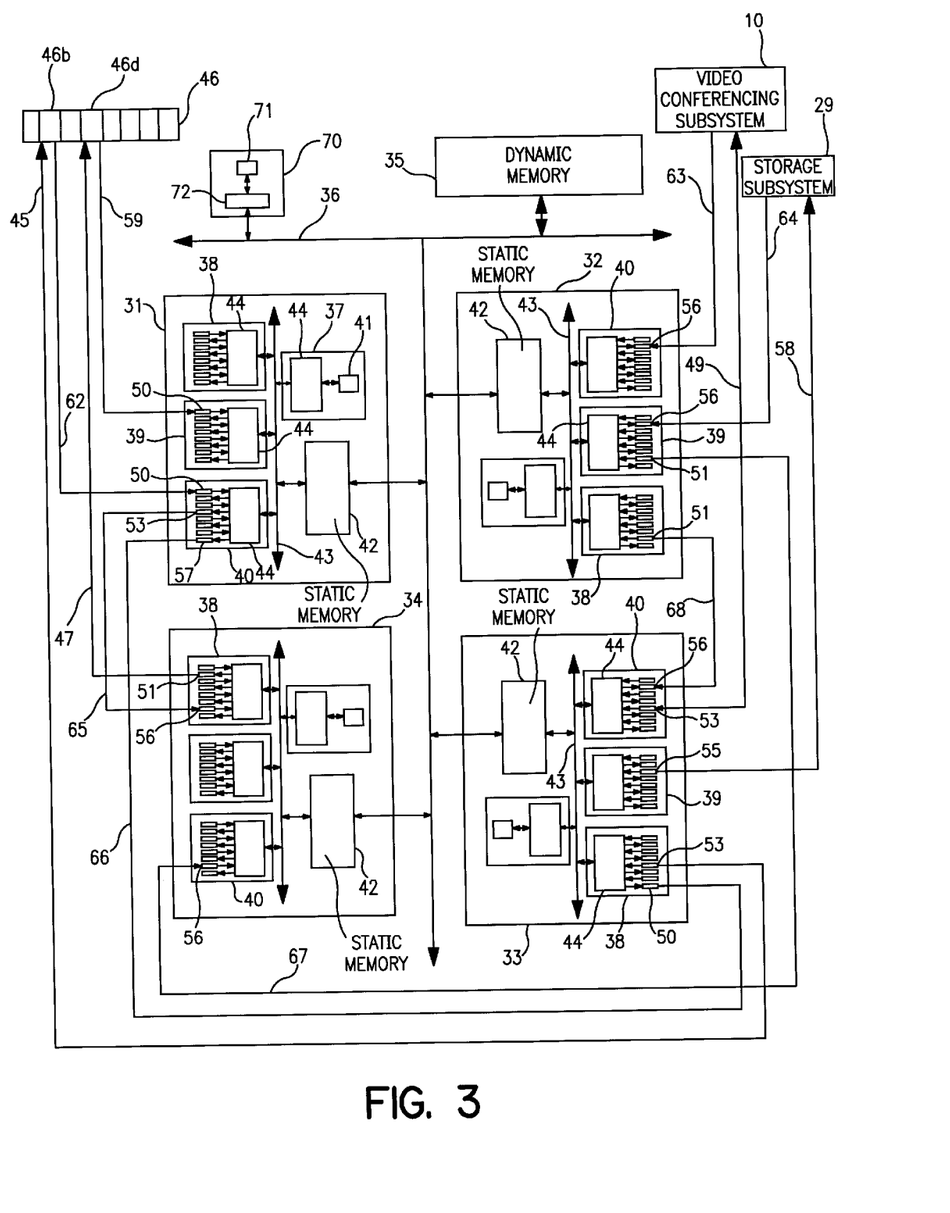
FIG. 3 shows a or stand alone routing switch center according to the invention.

FIG. 3 shows one possible implementation of the group switching centers according to the invention. It indicates a first set of stand alone routing switches 31, 32 and a second set of stand alone routing switches 33, 34. A switching center 31, 32, 33, 34 in this case comprises three high-density integrated circuits 38, 39, 40. Each circuit 38, 39, 40 in this case comprises four sending ports 51, 53, 55, 57 and four receiving ports 50, 52, 54, 56. The number of integrated circuits and the number of ports in the integrated circuits in this case have only been chosen so as not to unnecessarily complicate the drawing.

Each sending or transmitting port of the group switching center 33 and 34 is intended to be connected to a data terminal equipment unit such as the nearby videoconferencing subsystem 10 and storage subsystem 29 or the remote circuit 28. For example, in the switching center 33, the subsystem 10 is connected by a line 49 to the port 53 of the circuit 40, and the subsystem 29 is connected to the port 55 of the circuit 39. Other available ports of the circuits 38 through 40 can be connected to the subsystems 10 and 29 by other lines not shown, in order to increase the flow of data to these pieces of equipment. Since the subsystems 10 and 29 in this case are considered to be near to the set of switching centers 33 and 34, the lines 49 and 58 are embodied by means of electrical cables. On the other hand, for a remote data terminal equipment unit such as the circuit 28, it is advantageous to use fiber optics. In this case, each fiber optic cable is connected to an optoelectronic converter 46b, 46d of a terminal block 46 near the switching centers 33 and 34. The switching centers 33 and 34 are simply connected to the terminal block 46 by means of electrical cables. For example, in the switching center 33, the converter 46b is connected by a line 45 to the port 53 of the circuit 38. In the switching center 34, the converter 46d is connected by a line 47 to the port 51 of the circuit 38. Other available ports of the circuits 38 through 40 can be connected to the terminal block 46 by other lines, not shown, in order to increase the flow of data to these pieces of equipment or to distribute the data flow through various circuits 28 connected by fiber optics to the terminal block 46.

Each sending port of the switching centers 31 and 32 is intended to be connected to a receiving port 50, 52, 53, 56 of the switching centers 33 and 34. For example, in the switching center 31, the port 56 of the circuit 38 of the switch 34 is connected by a line 65 to the port 53 of the circuit 40, and the port 50 of the circuit 38 of the switching center 33 is connected to the port 57 of the circuit 40. Other available ports of the circuits 38 through 40 can be connected to the switching centers 33 and 34 and by other lines, not shown, in order to increase the flow of data to these switches. Since the switching centers 31 and 32 in this case are considered to be near to the set of switching centers 33 and 34, the lines 65 and 66 are embodied by means of electrical cables. On the other hand, for remote switches, it is advantageous to use fiber optics connected to an optoelectronic converter of the terminal block 46 near the switching centers 31 and 32. The switching centers 31 and 32 in this case are simply connected to the terminal block 46 by means of electrical cables. The switching centers shown in FIG. 3 are considered to be nearby. For example, in the switching center 32, the port 56 of the circuit 40 of the switching centers 34 is connected by a line 67 to the port 51 of the circuit 39, the port 56 of the circuit 40 of the switching center 33 is connected to the port 51 of the circuit 38. Other available ports of the circuits 38 through 40 can be connected to the switching centers 33 and 34 by other lines, not shown, in order to increase the flow of data to these switches.

Figure 4:
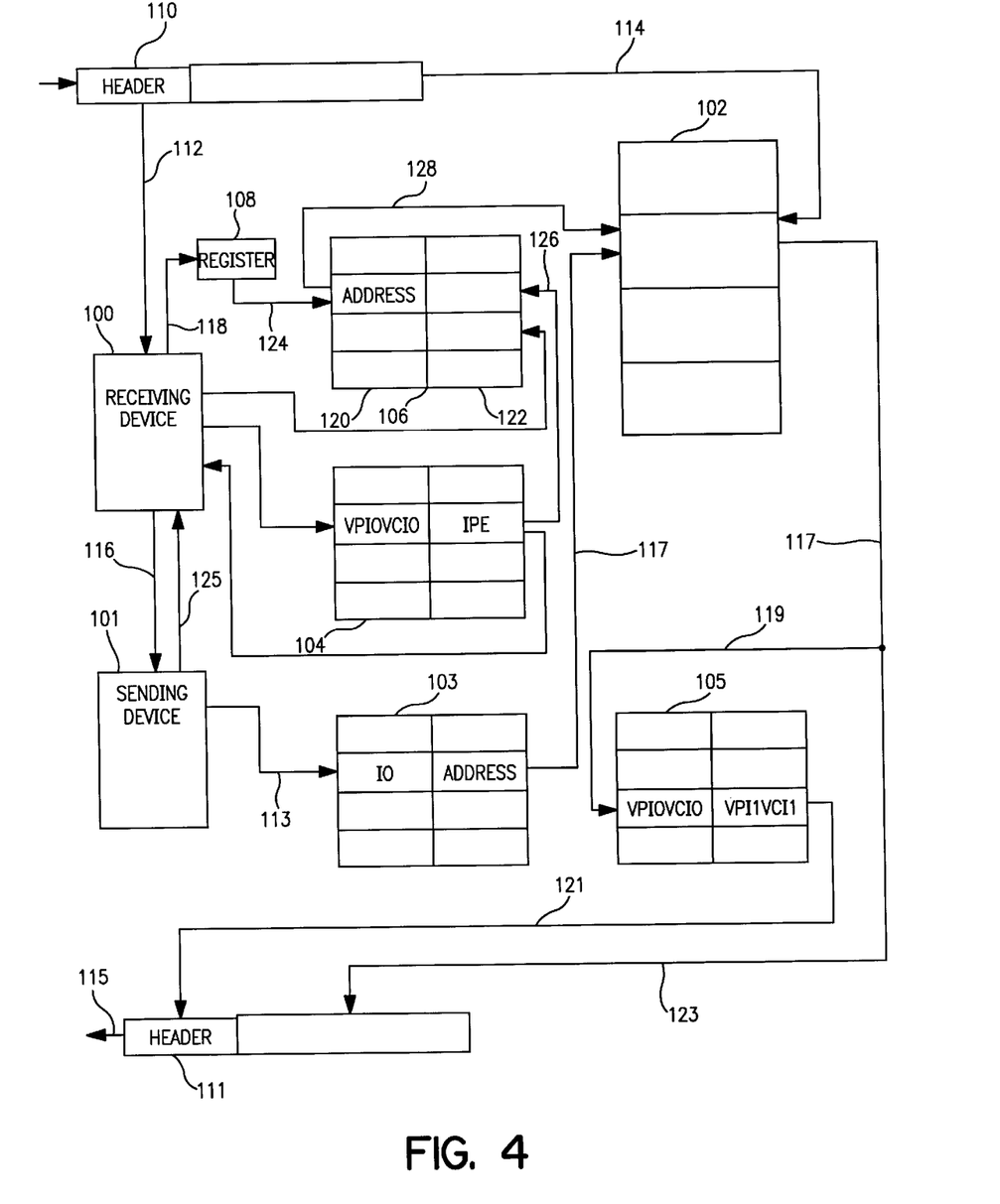
FIG. 4 shows an operation of the group switching center according to the invention.

FIG. 4 makes it possible to explain an operation of the group switching center by means of receiving devices 100 and sending devices 101, without at first being concerned with the physical location of these devices in the switching center. Each receiving port of the switching center is assigned a receiving stack 102 and each sending port is assigned a sending stack 103. The receiving stack 102 is constituted by data blocks of fixed size, which are addressable in a single logical address space. The sending stack 103 is constituted by bytes, each byte containing as many bits as are necessary to encode an address of this single logical address space.

The receiving port receives data from outside the switching center, constituted by series of binary bites, defined in a predetermined format. In Ethernet-type technology, the format is one of frames, each of which contains a variable number of bytes. A frame comprises a header and a body of usable data. The usable data are those processed by the data terminal equipment units. The header is essentially constituted by a byte which delimits the start-of-frame, followed by bytes encoding a destination address of the frame, followed by bytes encoding a source address, followed by bytes encoding a quantity of bytes contained in the body of usable data. In ATM-type technology, the format is one of cells, each of which contains a constant number of bytes, typically fifty-three bytes. A cell comprises a header and a body of usable data. The body of usable data contains, for example, forty-eight bytes processed by the data terminal equipment units. Thus, the header contains five bytes for encoding a virtual path identifier VPI, a virtual channel identifier VCI in the virtual path, and communication control indicators liked to the virtual channel. A specific byte value, for example null, encodes an empty state of the cell.

It is possible to implement the invention using either frames or cells. However, an implementation based on cells has the advantage of simplicity and of performances which facilitate the description in reference to FIG. 4.

Associated with the receiving stack 102 is a routing table 104, each line of which is indexed in correspondence with each virtual path VPI0 and each virtual channel VCI0 whose receiving port constitutes a physical medium. Each line contains as many logical indicators IPE as the switch contains sending ports. Each sending port is assigned a logical indicator IPE, for example a bit, a first state of which indicates that the sending port constitutes the physical medium for containing the virtual path VPI0 and the virtual channel VCI0 in correspondence with the indexed line of the table 104. Any other state of the logical indicator indicates that the sending port does not constitute the physical medium for containing the virtual path VPI0 and the virtual channel VCI0 in correspondence with the indexed line of the table 104.

Associated with the sending stack 103 is a routing table 105, each line of which is indexed in correspondence with each virtual path VPI0 and each virtual channel VCI0 whose sending port constitutes the physical medium. Each line contains a virtual path indicator VPI1 and a virtual channel indicator VCI1 to which the virtual path VPI0 and the virtual channel VCI0 are switched, so that the sending port constitutes a physical medium for containing the virtual path VPI1 and the virtual channel VCI1.

When a cell is presented (112) by the receiving port to the receiving device 100 assigned to this port, the receiving device processes the cell in the following way. If the value of the header identifies an empty state of the cell, the cell is ignored. If not, the content of the cell is stored (114) in an available block of the stack 102. In the exemplary implementation described, the size of a block is sixty four bytes. Thus, for a fifty-three byte cell, eleven bytes remain available. An interrupt I0, accompanied by the address of the block of the stack 102 in which the presented cell is stored, is sent (116) to each sending device 101 assigned to a sending port constituting the physical medium for containing the virtual path VPI0 and the virtual channel VCI0 identified in the header 110 of the presented cell.

Each sending device 101 assigned to a sending port essentially fulfills two functions, a first function for handling interrupts I0 issuing from receiving devices 100, and a second function for sending cells.

According to the first function, upon each reception of an interrupt I0 issuing from a receiving device 100, the address that accompanies this interrupt is stored (113) in the sending stack (103).

According to the second function, cells are sent (115) continuously through the sending port. If the stack 103 is empty, a particular value of the indicators VPI1 and VCI1 is loaded into the header of the sent cell to indicate that it constitutes an empty cell. This particular value is, for example, zero. If the stack 103 is not empty, the first address stored in the stack is retrieved in order to read (117) the block corresponding to this address. The indicators VPI0 and VCI0 are retrieved (119) from the first five bytes of the block in order to point to the line of the routing table 105 indexed in correspondence with the indicators VPI0 and VCI0. The indicators VPI1 and VCI1 contained in the line pointed to are stored (121) in the header 111 of the sent cell and the forty-eight bytes following the first five bytes of the block are stored (123) in the body of usable data of the cell, while any remaining bytes are ignored. An interrupt I1 is sent (125) to the receiving device 100 in order to indicate to it that the block of the stack 102 had been read by the sending device 101 in question. By systematically retrieving the first address stored in the stack 103, the usable bodies of cells are sent in the order of the interruptions I0 received, and consequently in the order of the presentation of the cells to the receiving devices 100.

It is possible to conceive of different means for making the blocks of the stack 102 available after having been read by the devices 101, and for using these available blocks. In reference to FIG. 4, the device 100 has a stack of addresses 106 whose structure is explained as follows. Each line of the stack 106 contains two bytes 120, 122. The first byte 120 of the first line contains a first block address of the stack 102. The first byte of each subsequent line of the stack 106 contains an address which follows the one contained in the previous line of the stack 106. Initially, the second byte 122 of each line of the stack 106 contains a pointer to the next line of the stack 106, with the exception of the second byte of the last line, which contains a pointer to the first line. A register 108 contains a pointer to a line whose first byte contains an address of the first available block of the stack 102, which initially points to the first line of the stack 106. Thus, initially there is a circular stack of addresses constituted by the first bytes 120 of the stack 106, wherein the address of the next available block is given by the line pointed to by the second byte 122 of each line.

In order to store (114) a presented cell in the stack 102, the receiving device 100 branches (118) to the line of the stack 106 pointed to (124) by the content of the register 108 and stores in the register 108 the value of the second byte of the line pointed to. The device 100 stores (126) in the second byte 122 of the line pointed to, the line of the routing table 104 indexed in correspondence with the indicators VPI0 and VCI0 of the presented cell. The device 100 stores (114) the presented cell in the block addressed (128) by the first byte of the line pointed to and sends (116) to each sending device in which the logical indicator IPE of the sending port indicates the constitution of a physical medium, an interrupt I0 accompanied by the address of the line pointed to (124) in the stack 106 and by the value of the first byte 120 of this line pointed to.

Upon reception of an interrupt I1 sent (125) by a sending device 101 for a line pointed to in the stack 106, the receiving device 100 nullifies the logical indicator corresponding to the sending device 101 in the second byte 122 of the line pointed to. A null value of the second byte of the line pointed to indicates that all the sending devices 101 involved have read the block addressed (128) by the first byte 120. The receiving device 100 then stores, in the second byte of the line pointed to, the value of the register 108 and simultaneously stores in the register 108 a pointer to the line thus freed. This makes it possible to use an available block as soon as it has been read by all the sending devices involved.

For an implementation of the invention based on frames of variable length as in Ethernet-type technology, a plurality of blocks of the stack 102 may be necessary for temporarily storing each frame waiting to be sent. This requires that the stack 103 be able to contain a plurality of addresses of the stack 102 linked to a single interrupt I0.

In Ethernet-type technology, the header 110, 111 of a frame contains a destination IP address which remains identical on all paths of the frame from the sending data terminal equipment unit to the receiving data terminal equipment in monocast mode, and to all receiving data terminal equipment units in multicast mode or broadcast mode. The routing table 105 in this case is unnecessary since the frame is sent (115) as contained in one or more blocks of the stack 102.

No matter what technology is used, Ethernet, ATM or another type, it is advantageous to use each receiving device 100 in physical proximity to the receiving port through which it operates and each sending device 101 in physical proximity to the sending port through which it operates, in order to obtain good performance in terms of processing speed. The same is true for the receiving stacks 102 and the sending stacks 103. For this purpose, a very high density integrated circuit 38 comprises a plurality of receiving ports 50, 52, 54, 56, a plurality of sending ports 51, 53, 55, 57, and a static memory 44 for containing the receiving devices 100 and blocks of the receiving stacks 102 assigned to the receiving ports 50, 52, 54, 56 as well as the sending devices 101 and blocks of the sending stacks 103 assigned to the sending ports 51, 53, 55, 57. Thus, the data exchanges for managing the receptions and transmissions can occur at high speed in the same very high density integrated circuit. However, in spite of current and future capacities for very high levels of integration, the quantities of memory, sending ports and receiving ports that can be integrated on the same circuit are limited. Today, for example, it is conceivable to place twelve receiving ports and twelve sending ports on the same integrated circuit.

All the sending and receiving ports on the same integrated circuit do not necessarily function at their full load-carrying capacity at all times. It is therefore advantageous not to systematically have all of the receiving stacks 102 reside in the static memory 44 but in a memory outside the integrated circuit, in communication with the static memory 44 through the high-speed bus 43 used in the switch that is the subject of the invention. The data blocks constituting the receiving stacks 102 are addressed in the integrated circuit by means of a logical address space in common with the memory outside the integrated circuit, so that all that is physically present at any time in the static memory 44 are the copies of the block effectively in use by receiving devices 100 or sending devices 101 in execution in the circuit 38.

The switching center 31 of FIG. 3 comprises a static memory 42 in communication with the static memory 44 by means of a first-level cache consistency protocol through the bus 43. The first-level cache consistency protocol is of the write back type. Without expanding on this type of known protocol, let it simply be recalled that the writing of a copy of a block, from the static memory 42 to the static memory 44, is only triggered if a reading of the block experiences an addressing conflict with a copy of a block contained in the static memory 44. The static memory 42 contains physical copies of blocks of stacks 102, which the memory can make physical copies of according to the needs of the receiving devices 100 and sending devices 101. To maintain a low load on the circuit 38, all the updated copies of a block are located in the static memory 44. If the load increases, updated copies can be exchanged by means of the first-level cache consistency protocol with the static memory 42. Thus, the static memory 42 fulfills the function of an accumulator for absorbing overloads of the circuit 38. The static memory 42 has slower access to the sending and receiving ports but has a larger size than the static memory 44.

In order to increase the number of receiving ports and sending ports beyond what a single integrated circuit can accommodate, the switch 31 of FIG. 3 comprises other high density integrated circuits 39, 40 identical to the circuit 38. The static memories 44 of each circuit 38, 39, 40 are in communication with one another and with the memory 42 by means of the first-level cache protocol cited above.

In order to further increase the logical address capacities without unnecessarily overloading the memories 42 and 44, it is possible to have the static memory 42 communicate with a dynamic memory 35 by means of a second-level cache protocol through the bus 36. All that is present in the static memory 42 are copies of blocks of receiving stacks 102 for which a receiving port of the circuit 38 receives non-empty cells.

Consider the example of a sending device 101 located in a circuit 39 other than the circuit 38 in which is located the receiving device 100 which writes into the stack 102 a block involving this sending device 101. By reading the block in question, the sending device 101 stores a physical copy of the block in the memory 44 of the circuit 39 by implementing the first-level cache consistency protocol. The implementation of the first-level cache consistency protocol makes the memory 42 update its physical copy of a block as it passes through the local bus 43. It is important to note that the implementation of the first-level cache consistency protocol makes it so that the memory 44 of the circuit 39 is only loaded with the block sent (115) by the device 101. The physical location of this block in the memory 44 of the circuit 39 can be made available for the implementation of the first-level cache consistency protocol by forcing, for example, an invalidation of a copy of this block in the memory 44 of the circuit 39 after this block has been sent by the sending port in question. The explanations given in this example may be considered valid for any receiving device 100 and any sending device 101 of the circuits 38, 39, 40 of the switch 31 in which the sending stacks 102 are addressed by means of a single logical address space.

Figure 5:
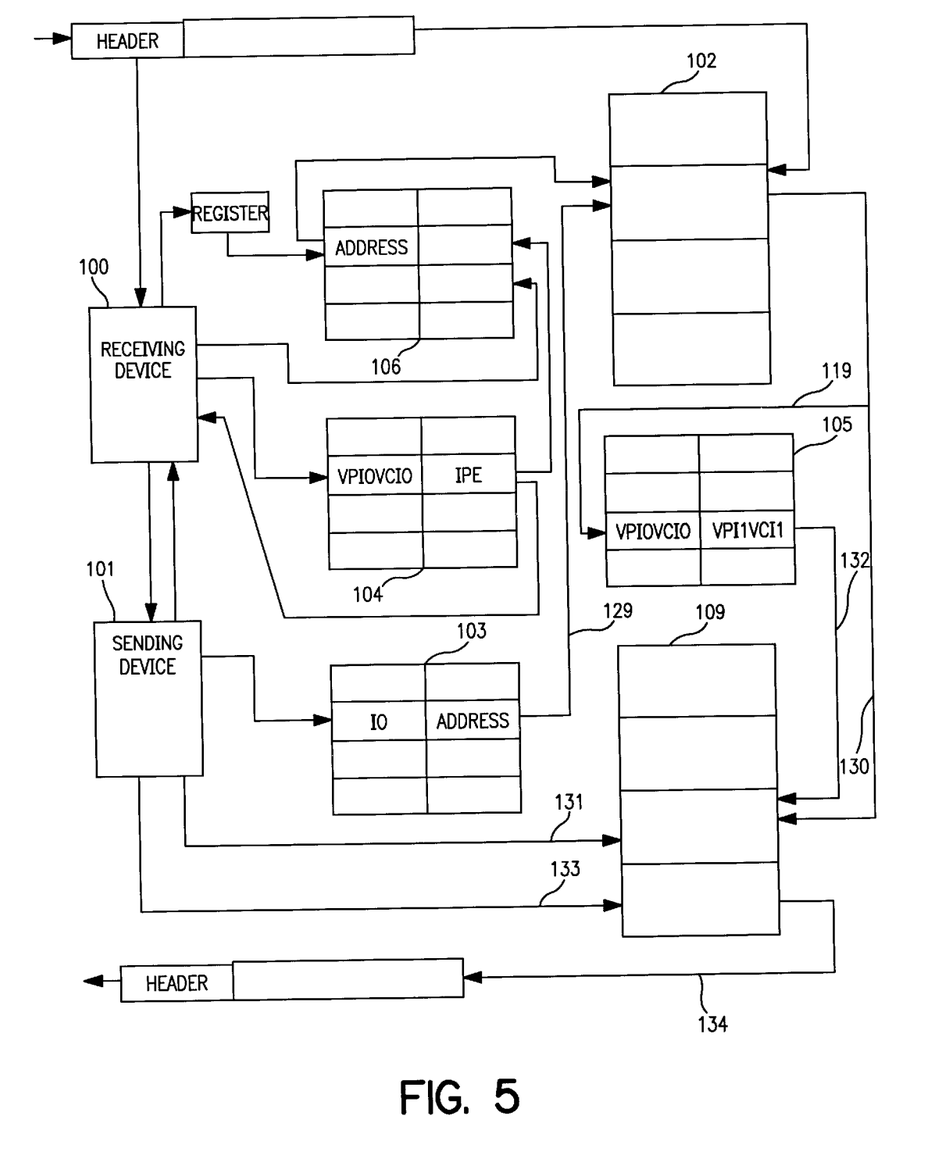
FIG. 5 shows another operation of the group switching center according to the invention.

In reference to FIG. 5, each sending device 101 has a sending stack 109 constituted by data blocks containing frames or cells to be sent through the associated sending port. When one or more sending devices 101, defined by the code IPE of the table 104 receive an interrupt I0 accompanied by a logical address A0 from the receiving device 100, each sending device 101 reads (129) the block addressed by A0 in the stack 102 and writes (130) the block into its sending stack 109 at a predetermined logical address (131) in a free space in the stack 109. Simultaneously, the device 101 reads (119) the indicators VPI0VCI0 and replaces them (132) in the stack 109 with the values VPI1VCI1 given by the table 105. Independently, the sending device 101 reads (133) the blocks of the stack 109 in accordance with sending priorities, so as to send (134) their contents to the associated sending port. Each sending of the content of a block frees a space in the stack 109.

Just as a receiving device 100 can send an interrupt I0 to a plurality of sending devices 101, a sending device 101 can receive interrupts I0 from a plurality of different receiving devices 100. Thus, it is possible for a given sending device 101 to write into its sending stack 109 blocks issuing from a plurality of receiving stacks 102. A write stream (130) of higher value than the read stream (134) in the sending stack 109 increases the size of the sending stack 109. This does not pose any logical addressing problem since the maximum size of the stack can arbitrarily be set at a value that is high enough to never be reached. The static memory 44, which is of necessity limited in order to be integrated into a circuit 38, 39, 40, can only contain a limited number of physical copies of blocks of the stack 109. When a writing (130) of a new block into the stack 109 requires a new space in the static memory 44 in order to store a physical copy of this new block in it and no space is available in the static memory 44, the first-level cache consistency protocol replaces a physical copy of an old block in the static memory 44 with the physical copy of the new block. The static memory 42 in communication with the static memory 44 by means of the first-level cache consistency protocol makes it possible to save a valid copy of the old block, which can be reused during the reading (134) of this old block. The first-level consistency protocol in this case will send this old copy of a block through the bus 43 to the memory 44 associated with the sending device 101. It is important to appreciate the accumulator role played by the static memory 42 with the aid of the first-level cache consistency protocol. In effect, when a physical copy of the stack 109 will not completely fit into the static memory 44, a physical copy of the stack 109 remains available in the static memory 42.

If the sending device 101 runs on a circuit 38, 39, 40 different from the circuit 38, 39, 40 on which the receiving device 100 is running, the reading (129) of a block of the stack 102 by the sending device 101 causes this block to be sent through the local bus 43. At the first reading of this 21 block, the first-level cache consistency protocol causes the static memory 42 to re-update its copy of this block in the stack 102. If the copy of this block in the stack 102 has been overwritten in the memory 44 by the writing of a new block at another logical address of the stack 102, a sending of the overwritten block through the bus 43 is necessary if no updated copy of the overwritten block exists in the memory 42. If, in the memory 42, there is an updated copy of the block overwritten in the memory 44 on which the receiving device 101 is running, the first-level cache consistency protocol makes all the subsequent readings of this block take place on the valid copy of this block in the memory 42. The accumulator role played by the memory 42 prevents the loss of any cells or frames comprised in the blocks of the sending and receiving stacks which may have resulted from a saturation of these stacks.

Figure 6:
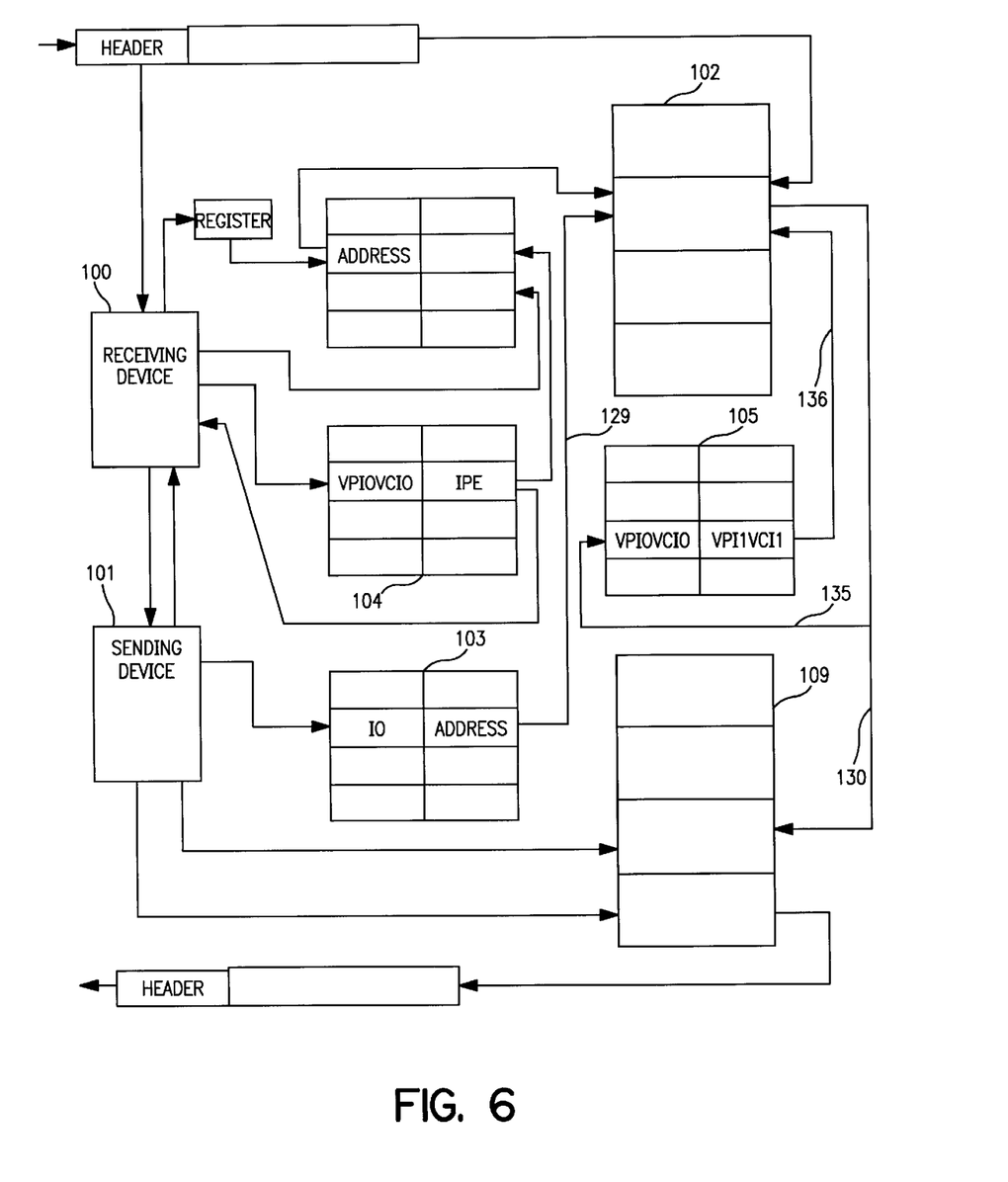
FIG. 6 shows a variant of the operation shown in FIG. 5.

In reference to FIG. 6, the identifiers VPI0VCI0 are read (135) in the receiving stack 102, then replaced (136) in the receiving stack 102 with the aid of the correspondence table 106 by new identifiers VPI1VCI1. The identifiers VPI1VCI1 are identical for all the receiving devices 101 referred to by the same identifiers VPI0VCI0. A writing (130) of a block into the stack 109 from the stack 102 then takes place with the final value of the identifiers VPI1VCI1. In the absence of any further processing on the value of the block written into the stack 109, the write operation (130), in combination with the implementation of the first-level cache consistency protocol, results in an update of the copy of this block in the memory 42. If a copy of a block of the stack 109 in the memory 44 needs to be replaced by the first-level cache consistency protocol, it is no longer necessary to retrieve this copy of a block in the memory 42, since the latter no longer holds an updated copy. This minimizes the sending of a block through the local bus 43.

In order to increase the number of receiving ports and sending ports beyond the number contained in the switching center 31, FIG. 3 presents a butterfly layout of switching centers 32, 33, 34 identical to the switching center 31. The memory 42 of each switching center 31, 32, 33, 34 communicates with the memory 35 by means of the second-level cache consistency protocol cited above. With a butterfly layout of a greater number of switching centers, possibly on a plurality of levels, it is possible to increase, in an almost unlimited way, the number of receiving ports and sending ports available for the data terminal equipment units connected to these switching centers.

The static memory 42 has a size such that it is able to contain a physical address of all the receiving and sending stacks addressed logically in the circuits 38, 39 and 40. Moreover, each switch 31, 32, 33, 34 has its own logical address sub-space, distinct from the logical address sub-spaces of the other switches. Each logical address sub-space has a size such that it can address all of the receiving and sending stacks of a single switch. Thus, updates of data blocks in the receiving and sending stacks caused by the receiving and sending of cells through the ports of a switch do not involve the second-level cache consistency protocol.

In reference to FIG. 3, the group switching center 31 comprises a high-density integrated circuit 37. The circuit 37 comprises a microprocessor 41 and a static memory 44' in communication with the memories 44 of the circuits 38, 39, 40 and with the memory 42 by means of the first-level cache consistency protocol through the bus 43. This communication allows the microprocessor 41 to keep up-to-date the correspondence tables 104 and 105 indicated in FIGS. 4 through 6, by executing a signaling protocol which involves the switching center 31.

In the case of a butterfly layout of a plurality of identical switching centers 31, 32, 33, 34, a high-density integrated circuit 70 comprises a microprocessor 71 and a static memory 72. The static memory 72 is in communication with the memory 35 and with the memories 42 of each switching center 31, 32, 33, 34 by means of the second-level cache consistency protocol in the bus 36. This communication enables the microprocessor 71 to keep up-to-date the correspondence tables 104 and 105 indicated in FIGS. 4 through 6 by executing a signaling protocol which involves all of the switching centers 31, 32, 33, 34. This makes it possible to optimize the signaling protocol in such a way as to consider all of the switching centers in a butterfly layout as a single group switching center.

While the preferred forms and embodiments or the invention have been illustrated and described, it will be apparent to those of ordinary skill in the art that various changes and modifications may be made without deviating from the inventive concept and spirit of the invention as set forth above, and it is intended by the appended claims to defining all such concepts which come within the full scope and true spirit of the invention.

What is claimed is:

1. A routing switch for at least one of establishing virtual channels from a sending data terminal equipment unit; establishing virtual channels for to at least one receiving data terminal equipment unit and from a plurality of sending data terminal equipment units to at least one receiving data terminal equipment unit and establishing virtual channels with at least one possible second similar routing switch to which other data terminal equipment units are connected, the routing switch comprising:

a plurality of first sending ports; and
a plurality of first receiving ports:
wherein each of the first sending ports being adapted to be connected to at least one of the receiving data terminal equipment units or to a second receiving port of the second routing switch, each of the first receiving ports adapted to be connected to at least one of the sending data terminal equipment units or to a second sending port of the second routing switch,
wherein each of the first receiving ports being assigned a receiving stack addressable in a single logical address space and each of the first sending ports being assigned a sending stack for containing addresses of the single logical address space, and
wherein the first sending ports and the receiving ports of the routing switch being grouped together in at least one first high-density integrated circuit, each of which including a first access memory physically read-accessed by the sending ports and write-accessed by the receiving ports grouped in the same integrated circuit, the at least one first high-density integrated circuit being connected to a second access memory in the routing switch by means of a local bus for exchange of data blocks between the first access memories and the second access memory by means of a first-level cache consistency protocol.

2. The routing switch according to claim 1, further including a second high-density integrated circuit having a microprocessor and a static memory in communication with the first access memory of the first integrated circuits and with the second access memory by means of the first-level cache consistency protocol-through the local bus.

3. The routing switch according to claim 1, wherein the single logical address space is common to the first routing switch and to at least one of a command processor and the second routing switch.

4. The routing switch according to claim 1, wherein the second access memory is connected to a dynamic memory by means of an external bus for exchange of data blocks between the second access memory and the dynamic memory by means of a second-level cache consistency protocol.

5. The routing switch according to claim 1, wherein the respective receiving ports and sending ports are respectively intended to receive and send, without interruption, cells constituted by a constant number of bytes.

6. The routing switch according to claim 1, wherein the links include at least one local area network.

7. A routing switch for establishing virtual channels from a sending data terminal equipment unit to at least one receiving data terminal equipment unit and from a plurality of sending data terminal equipment unit and for establishing virtual channels with at least one possible second similar routing switch to which other data terminal equipment units are connected, the routing switch comprising:

a plurality of first sending ports; and
a plurality of first receiving ports,
wherein each of the first sending ports being adapted to be connected to at least one of the receiving data terminal equipment units or to a second receiving port of the second similar routing switch, each of the first receiving ports adapted to be connected to at least one of the sending data terminal equipment units or to a second sending port of the second similar routing switch,
wherein each of the first receiving ports being assigned a receiving stack addressable in a single logical address space and each first sending port being assigned a sending stack for containing data blocks addressed in the single logical address space, and
wherein the first sending ports and the receiving ports of routing switch being grouped together in at least one first high-density integrated circuit, each of which including a first access memory physically read-accessed by the sending ports and write-accessed by the receiving ports grouped in the same integrated circuit, the at least one first high-density integrated circuit being connected to a second access memory in the routing switch by means of a local bus for exchange of data blocks between the first access memories and the second access memory by means of a first-level cache consistency protocol.

8. The routing switch according to claim 7, further comprising a second high-density integrated circuit having a microprocessor and a static memory in communication with the first access memory of the first integrated circuits and with the second access memory by means of the first-level cache consistency protocol through the local bus.

9. The routing switch according to claim 7, wherein the signal logical address space is common to the first routing switch and to at least one of a command processor and the second routing switch.

10. The routing switch according to claim 7, wherein the second access memory is connected to a dynamic memory by means of an external bus for exchange of data blocks between the second access memory and the dynamic memory by means of a second-level cache consistency protocol.

11. The routing switch according to claim 7, wherein the respective receiving ports and sending ports are respectively intended to receive and send, without interruption, cells constituted by a constant number of bytes.

12. The switching assembly according to claim 7, wherein the links include at least one local area network.

13. A data communication system, comprising a first and at least one possible second similar routing switches, the first routing switch establishing virtual channels from a sending data terminal equipment unit to at least one receiving data terminal equipment unit and from a plurality of sending data terminal equipment units to at least one receiving data terminal equipment unit and establishing virtual channels with the at least one possible second similar routing switch to which other data terminal equipment units are connected, the first routing switch comprising:

a plurality of first sending ports; and
a plurality of first receiving ports,
wherein each of the first sending ports being adapted to be connected to at least one of the receiving data terminal equipment units or to a second receiving port of the second similar routing switch, each of the first receiving ports adapted to be connected to at least one of the sending data terminal equipment units or to a second sending port of the second similar routing switch, wherein each of the first and second receiving ports being assigned a receiving stack addressable in a single logical address space and each of the first and second sending ports being assigned a sending stack for containing addresses of the single logical address space, and wherein the first and second sending ports and the receiving ports of each of the respective first and possible second routing switches being grouped together in at least one first high-density integrated circuit, each of which including a first access memory physically read-accessed by the sending ports and write-accessed by the receiving ports grouped in the same integrated circuit, the at least one first high-density integrated circuit in each of the first and possible second routing switches being connected to a second access memory by means of a local bus for exchange of data blocks between the first access memories and the second access memory by means of first a first-level cache consistency protocol.

14. The data communication system of claim 12, wherein an equal even number of the first and second routing switches constitutes each of a first and second set, the receiving ports of the routing switches of the first set and the sending ports of the routing switches of the second set being adapted to be connected to data terminal equipment units of the data communication system and the sending ports of the routing switches of the first set being adapted to be connected to the receiving ports of the routing switches of the second set.

15. The data communication system according to claim 12, further comprising a cache consistency protocol and wherein the routing switches of the first and second sets are connected to a dynamic memory through an external bus for controlling exchanges of data blocks by means of the cache consistency protocol.

16. The data communication system according to claim 12, wherein the routing switches are arranged in a butterfly layout.

17. The data communication system according to claim 12, wherein the data communication system is adapted to form a videoconferencing system.

18. A data communication system, comprising of first and at least one possible second similar routing switches, the first routing switch establishing virtual channels from a sending data terminal equipment unit to at least one receiving data terminal equipment unit and from a plurality of sending data terminal equipment units to at least one receiving data terminal equipment unit and establishing virtual channels with the at least one possible second similar routing switch to which other data terminal equipment units are connected, the first routing switch comprising:

a plurality of first sending ports; and a plurality of first receiving ports, wherein each of the first sending ports being adapted to be connected to at least one of the receiving data terminal equipment units or to a second receiving port of the second similar routing switch, each of the first receiving ports adapted to be connected to at least one of the sending data terminal equipment units or to a second sending port of the second similar routing switch, wherein each of the first and second receiving ports being assigned a receiving stack addressable in a single logical address space and each of the first and second sending ports being assigned a sending stack for containing data blocks addressed in the single logical address space, and wherein the first and second sending ports and the receiving ports of each of the respective first and possible second routing switches being grouped together in at least one first high-density integrated circuit, each of which including a first access memory physically read-accessed by the sending ports and write-accessed by the receiving ports grouped in the same integrated circuit, the at least one first high-density integrated circuit in each of the first and possible second routing switches being connected to a second access memory by means of a local bus for exchange of data blocks between the first access memories and the second access memory by means of a first-level cache consistency protocol.

19. The data communication system of claim 18, wherein the an equal even number of the first and second routing switches constitutes each of a first and second set, the receiving ports of the routing switches of the first set and the sending ports of the routing switches of the second set being adapted to be connected to data terminal equipment units of the data communication system and the sending ports of the routing switches of the first set being adapted to be connected to the receiving ports of the routing switches of the second set.

20. The data communication system according to claim 18, further comprising a cache consistency protocol and wherein the routing switches of the first and second sets are connected to a dynamic memory through an external bus for controlling exchanges of data blocks by means of the cache consistency protocol.

21. The data communication system according to claim 18, wherein the routing switches are arranged in a butterfly layout.

22. The data communication system according to claim 18, wherein the date communication system is adapted to form a videoconferencing system.

* * * * *

UNITED STATES PATENT AND TRADEMARK OFFICE
CERTIFICATE OF CORRECTION

PATENT NO. : 6,373,850 B1
DATED : April 16, 2002
INVENTOR(S) : Lecourtier et al.

It is certified that error appears in the above-identified patent and that said Letters Patent is hereby corrected as shown below:

Column 15,
Line 28, delete "12" and replace with -- 13 --;
Line 39, delete "12" and replace with -- 13 --;
Line 45, delete "12" and replace with -- 13 --;
Line 48, delete "12" and replace with -- 13 --;

Signed and Sealed this

Fifth Day of November, 2002

*Attest:*

JAMES E. ROGAN
*Director of the United States Patent and Trademark Office*

*Attesting Officer*